No. 652,672. Patented June 26, 1900.
J. S. FLEMING & H. FROEHLING.
PROCESS OF EXTRACTING SULFUR FROM ORES.
(Application filed June 16, 1899.)
(No Model.)
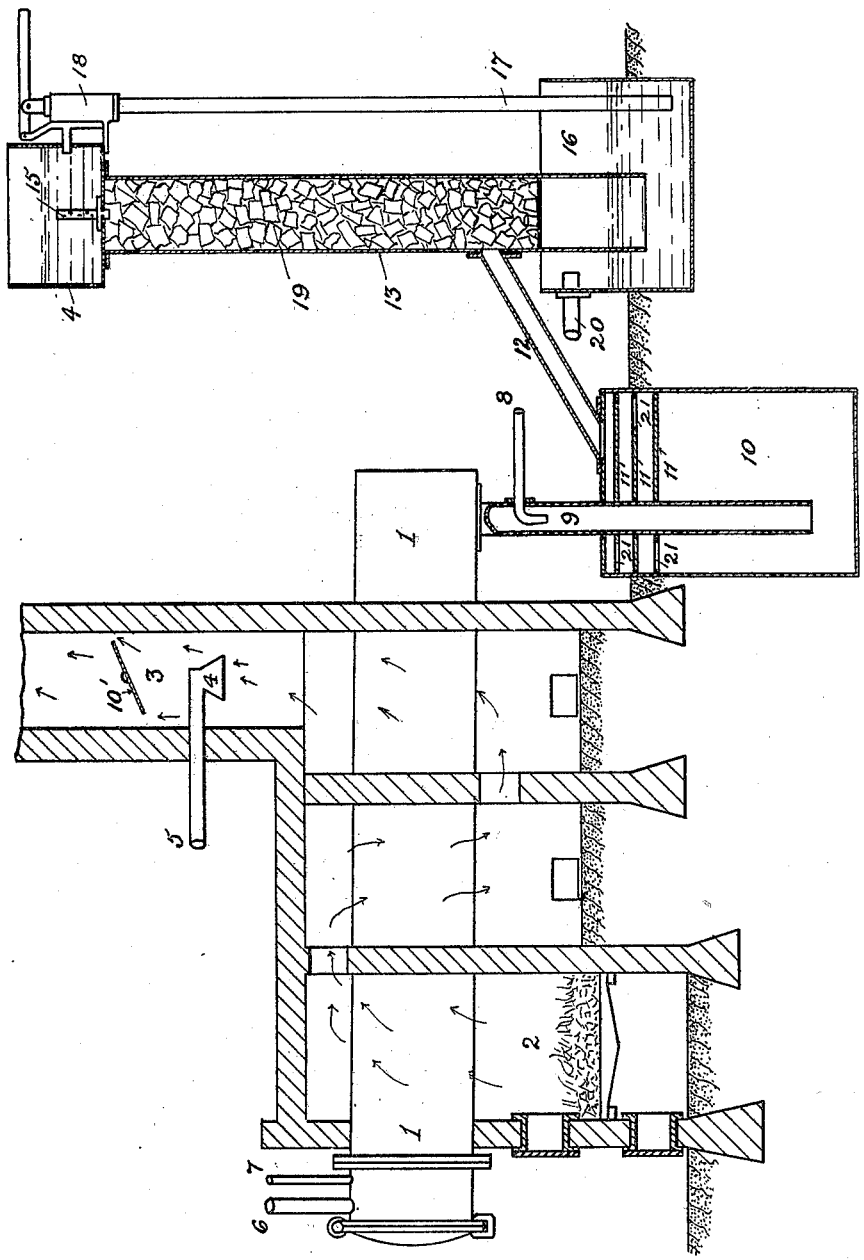
WITNESSES:
INVENTORS
John Syme Fleming,
& Henry Froehling.
BY
Stewart & Stewart
ATTORNEYS

UNITED STATES PATENT OFFICE.

JOHN SYME FLEMING AND HENRY FROEHLING, OF RICHMOND, VIRGINIA.

PROCESS OF EXTRACTING SULFUR FROM ORES.

SPECIFICATION forming part of Letters Patent No. 652,672, dated June 26, 1900.

Application filed June 16, 1899. Serial No. 720,865. (No specimens.)

*To all whom it may concern:*

Be it known that we, JOHN SYME FLEMING and HENRY FROEHLING, citizens of the United States of America, and residents of Richmond city, in the State of Virginia, have invented certain new and useful Improvements in Processes of Extracting Sulfur from Ores, of which the following is a specification.

Our invention relates to improvements in the old process of separating sulphur from iron pyrites and from iron and copper pyrites by distillation.

By the old process of distillation of sulphur from iron pyrites only one-half of the sulphur contained in the ore could be separated. This is the amount of sulphur which is theoretically separable in a free state from the ore by distillation in a properly-arranged apparatus without access of air, and this action is expressed by the equation $FeS_2 = FeS + S$, in which one part of iron pyrites, consisting of one atom of iron and two atoms of sulphur, gives up one atom of its sulphur and retains the second atom of sulphur in combination with the iron, forming sulphide of iron. However, when the separation of sulphur from iron pyrites by the old process of distillation is conducted on a large scale the ore rarely yields more than sixteen per cent. of the contained sulphur. By the admission of air, which contains oxygen, to the distilling apparatus the combination of the atom of iron with the second atom of sulphur in the sulphide of iron was broken, and the sulphur was separable, not in a free state, but in the form of sulphur dioxide, and in order to recover the sulphur from the sulphur dioxide it was necessary to subject the latter to further treatment by other and separate processes.

The object of our invention is to overcome these disadvantages in a simple manner and to separate from the sulphur-bearing ore a larger percentage of sulphur in an uncombined state than is separable by the process of distillation as heretofore conducted; and it consists in separating sulphur from sulphur-bearing ores by heating the ore in an atmosphere consisting of a gas or gases which are not supporters of combustion, such as carbon dioxide or nitrogen or a mixture of both, and the addition of a small and regulated quantity of oxygen. As in the old process, so in our improved process, about one-half of the contained sulphur can theoretically be separated by distillation; but by our improved process we can, by conducting the operation of distilling the ore in an atmosphere consisting of a gas or gases which are not supporters of combustion, such as carbon dioxide or nitrogen or a mixture of both, and by admitting into the receptacle which contains the ore a small and regulated quantity of oxygen, the amount of oxygen admitted to the receptacle being determined as stated hereinafter, separate a further quantity of sulphur in a free state.

In the accompanying drawing, which forms a part of this specification, is shown a form of apparatus, partly in section and partly in elevation, adapted for use in the practice of our improved process.

We do not limit ourselves to the exact form and details of construction of the apparatus as shown in the drawing, which is used only to render clear the description of the manner in which we put our improved process into operation.

Referring to the drawing, 1 is a retort adapted to contain the ore undergoing treatment and set in a furnace having a grate 2 and a stack 3.

4 5 represent a pipe leading from the stack 3 and adapted to conduct from the stack the products of combustion arising from the grate 2.

10 is a damper situated in the stack 3.

6 and 7 are pipes connected with the interior of the retort 1, and 9 is a pipe connecting the interior of the retort 1 with the collecting chamber or condenser 10.

8 is a steam-pipe connected with the interior of the pipe 9.

11 11 are baffle-plates placed in the upper part of the condenser 10 and having openings 21.

12 is a pipe connecting the condenser 10 with a scrubbing-tower 13.

13 is a scrubbing-tower containing broken limestone 19 and connected at its upper end with a water-cistern 14, which has the perforated pipe 15, adapted to allow a gentle stream of water to flow from the cistern 14 down into the scrubbing-tower 13. At its lower end the scrubbing-tower projects into the tank.

20 is a water-supply pipe.

18 is a pump by means of which and the pipe 17 the liquids contained in the tank 16 can be lifted to the cistern 14.

The manner in which we put our process into practice is as follows: We place the sulphur-bearing ore in the retort 1, which is heated externally by the fire in the grate 2, in which either coke or coal can be burned. As soon as the temperature of the ore within the retort is raised sufficiently sulphur will be given off, and this action will continue until about one-half or the first equivalent of the sulphur contained in the ore is set free, leaving the remaining one-half or the second equivalent of sulphur in combination with the iron of the ore, forming sulphide of iron. At about this time we pass into the retort through the pipe 6 a gas or mixture of gases which are not supporters of combustion, such as carbon dioxide or nitrogen or a mixture of both, which when coke is the fuel burned in the grate 2 can be extracted from the stack 3 through the pipe 4 5 or can be derived from independent sources. A sufficient quantity of these gases should be admitted through the pipe 6 to keep the retort 1 and the condenser 10 full. We then admit to the retort 1 by means of the pipe 7 the small quantity of oxygen or air necessary for the successful working of our process, as explained hereinafter. A reaction takes place which we believe to be one or the other of the following: First, the admitted oxygen combines directly with the iron of the sulphide of iron, forming oxides of iron, and the sulphur of the sulphide of iron is set free in an uncombined state; second, the admitted oxygen combines with the sulphur of the sulphide of iron to form oxides of sulphur, which oxides are immediately reduced by the iron, with the formation of oxides of iron, the sulphur being set free in an uncombined state; but whether one of these is or is not the reaction which takes place we get oxides of iron and sulphur is set free in an uncombined state.

The amount of oxygen admitted and its rate of admission to the retort will necessarily depend upon the class of ore treated, upon the size of the charge, and upon the rate at which the process is worked and should be such a quantity as shall be sufficient to oxidize the iron of the ore forming the charge and, as far as we know, no more.

Now in practice on a large scale and under ordinary working conditions and taking into consideration the various grades of the different ores treated and the varying rate of progress of the operation it is not always practicable to so regulate the stream of admitted oxygen or air that it shall be correctly proportioned to the quantity of iron in the charge, nor under similar conditions is it always practicable to prevent the ingress of air through leaks in the apparatus—that is to say, it is not always practicable under ordinary working conditions to avoid the loss by oxidation of some part of the sulphur contained in or separated from the ore. Therefore when conducting our process on a large scale we connect with our condenser a scrubbing-tower 13, in which we fix whatever oxides of sulphur may be produced, any formation of which from these causes can be detected at a cock attached to the pipe 12, whereupon the quantity and the rate of admission of the oxygen or air can be readjusted.

Now the sulphur which is separated from the ore in both the primary and secondary stages of our improved process is for the most part in a state of extremely-fine division, a fact which renders its condensation and collection difficult and slow. We therefore in practice insert a steam-nozzle 8 in the pipe 9 or in the condenser 10. The steam admitted at this nozzle has the effect of causing the sulphur to condense more rapidly and in a creamy or semiliquid state.

Having now described our improved process for the separation of sulphur from sulphur-bearing ores, what we claim, and desire to secure by Letters Patent of the United States, is—

Process of obtaining sulphur from sulphur-bearing ores which consists of subjecting the ore to distillation in an atmosphere consisting of gas or gases which are not supporters of combustion, but with the admixture of a controlled quantity of oxygen substantially as described.

Signed by us at Richmond city, Virginia, this 13th day of June, 1899.

JOHN SYME FLEMING.
HENRY FROEHLING.

Witnesses:
S. G. WEBB,
JOS. W. HUNDLEY.